United States Patent [19]
Miller

[11] Patent Number: 5,737,220
[45] Date of Patent: Apr. 7, 1998

[54] METHOD OF DETERMINING EARTH ELASTIC PARAMETERS IN ANISOTROPIC MEDIA

[75] Inventor: Douglas E. Miller, Sandy Hook, Conn.

[73] Assignee: Schlumberger Technology Corporation, Ridgefield, Conn.

[21] Appl. No.: 557,026

[22] PCT Filed: Jun. 2, 1994

[86] PCT No.: PCT/IB94/00153

§ 371 Date: Dec. 5, 1995

§ 102(e) Date: Dec. 5, 1995

[87] PCT Pub. No.: WO94/29750

PCT Pub. Date: Dec. 22, 1994

[30] Foreign Application Priority Data

Jun. 7, 1993 [GB] United Kingdom ............ 9311696

[51] Int. Cl.⁶ .................................................. G06F 19/00
[52] U.S. Cl. .................................................. 364/421
[58] Field of Search .............................. 364/421, 422; 367/32, 34, 40, 27, 71, 72, 48

[56] References Cited

U.S. PATENT DOCUMENTS

| | | | |
|---|---|---|---|
| 4,633,449 | 12/1986 | Ingram et al. | 364/422 |
| 4,791,619 | 12/1988 | Liu | 367/35 |
| 5,278,805 | 1/1994 | Kimball | 367/32 |

OTHER PUBLICATIONS

Jones, L.E.A. and Wang, H.F., "Ultrasonic Velocities in Cretaceous Shales from the Williston Basin," *Geophysics*, vol. 46, No. 3 (mar. 1981) pp. 288–297.

Gaiser, J. E. "Transversely Isoptropic Phase Velocity Analysis from Slowness Estimates," *Journal of Geophysical Research*, vol. 95, No. B7 (1990) pp. 11,241–11,254.

White, J.E. et al., "Measured Anisotropy in Pierre Shale," *Geophysical Prospecting*, 31, pp. 709–725.

Ellefsen, et al., "Estimating a Shear Modulus of a Transversely Isotropic Formation," *Geophysics*, vol. 57, No. 11 (Nov. 1992), pp. 1428–1434.

Wolfram Research, Inc. Cf. *Mathematica* (Addison Wesley, 1971), pp. 659–662.

Miller, et al., "An Exact Inversion for Anisotropic Moduli from Phase Slowness Data," *Journal of Geophysical Research*, vol. 99, No. B11 (Nov. 10, 1994) pp. 21,651–21, 657.

Miller, et al., "An In Situ Estimation of Anisotropic Elastic Moduli for a Submarine Shale," *Journal of Geophysical Research*, vol. 99, No. B11 (Nov. 10, 1994) pp. 21,659–21, 665.

Hsu, et al., "Elastic Waves Through a Simulated Fractured Medium," *Geophysics*, vol. 58, No. 7 (Jul. 1993) pp. 964–977.

Carrion, et al., "Cross–Borehole Tomography in Anisotropic Media," *Geophysics*, vol. 57, No. 9 (Sep. 1992) pp. 1194–1198.

Graebner, "Plane–Wave Reflection and Transmission Coefficients for a Transversely Isotropic Solid," *Geophysics*, vol. 57, No. 11 (Nov. 1992), pp. 1512–1519.

*Primary Examiner*—Donald E. McElheny, Jr.
*Attorney, Agent, or Firm*—Martin D. Hyden; Brigitte L. Jeffery; Keith G. W. Smith

[57] ABSTRACT

A method of determining the elastic moduli of anisotropic earth strata uses acoustic and density data without making simplifying approximations of the Christoffel relation or the assumption of weak anisotropy. To this end, the relation is converted algebraically into a linear system and solved analytically to generate a solution for estimating elastic moduli. Preferably, a set of qP phase points obtained from walkaway VSP data, with multiple vertical angles, plus at least one vertical SV point, are used to derive the elastic moduli $A_{11}$, $A_{13}$, $A_{33}$, $A_{55}$. In the case of FTIV or other orthorhombic media, the method may also be applied to obtain additional elastic moduli.

11 Claims, 5 Drawing Sheets

METHOD OF DETERMINING EARTH ELASTIC PARAMETERS IN ANISOTROPIC MEDIA

FIELD OF THE INVENTION

This invention relates to a method of determining elastic parameters of earth strata, and more specifically to an improved method of determining elastic parameters in an anisotropic medium such as a Transversely Isotropic medium ("TI medium").

BACKGROUND

In geologic exploration and particularly in the exploration for underground hydrocarbon deposits, it is useful to obtain a measure of the elastic parameters of earth strata, either for the direct goal of understanding the behavior of the earth formations subject to mechanical stresses and strains, or as an intermediate step in improving seismic measurement and processing methods.

The elastic moduli of earth formations are directly related to, and useful for characterizing, rock strength, porosity, lithology, and pore fluids.

The elastic moduli of earth strata are also directly related to the acoustic propagation characteristics of the earth, and along with density constitute primary parameters of earth strata in seismology. The elastic moduli are related to the speed of propagation for elastic waves which may vary as a function of direction of propagation and direction of polarization. Waves with polarization direction approximately aligned with propagation direction are referred to as quasi P waves (qP). Waves with polarization direction approximately orthogonal to propagation direction are quasi shear waves (qS). The elastic moduli may be expressed as matrix elements $c_{ij}$ where $i \leq 6$, $j \leq 6$. The number of independent elastic parameters $c_{ij}$ can vary between two parameters in the case of an isotropic medium and 21 parameters for an arbitrary elastic medium.

The earth is comprised of many layers of geologic strata, and it is common to use a horizontally layered medium as a basic model of the earth, wherein each layer is attributed with elastic parameters corresponding to measured parameters such as the density and the propagation velocities for P, SV and SH waves. When anisotropy is encountered, it has been found to be particularly useful to model the earth as a TI elastic medium.

A TI medium is transversely isotropic with respect to some symmetry axis. Using the vertical axis as the symmetry axis, it is referred to as a "TIV medium", whereas if the horizontal axis is used as a symmetry axis, it is sometimes referred to as a "TIH medium". In either case, a TI medium is characterised by its density $\rho$ together with five independent elastic moduli relating stress and strain. In condensed subscript notation, with rotational symmetry around the 3-axis, the moduli are $\{c_{11}, c_{13}, c_{33}, c_{55}, c_{66}\}$. The density-normalised moduli, $A_{ij} = c_{ij}/\rho$, have dimensions of velocity$^2$ and are related to elastic propagation in the medium as follows. Any plane harmonic wave propagating in the medium, having a phase slowness vector $(p_1, p_3)$ lying, for example, in the 1-3 plane must have displacement either in the 1-3 plane (the qP or qSV case) or normal to it (the SH case). In either case, the squared phase slowness vector $(X, Z) = (p_1^2, p_3^2)$ must satisfy the appropriate Christoffel relation. In the SH case that is $$A_{66}X + A_{55}Z - 1 = 0; \tag{1}$$

and in the qP or qSV case that is $$A_{11}A_{55}X^2 + A_{33}A_{55}Z^2 + AXZ - (A_{11} + A_{55})X - (A_{11} + A_{55})Z + 1 = 0 \tag{2}$$

where $$A = A_{11}A_{33} + A_{55}^2 - (A_{13} + A_{55})^2 \tag{3}$$

The density normalized moduli in a TI medium correspond to physical parameters as follows:

$$A_{11} = A_{22} = v^2 \tag{4a}$$

for horizontally propagating P-waves $$A_{33} = v^2 \tag{4b}$$

for vertically propagating P-waves $$A_{44} = A_{55} = v^2 \tag{4c}$$

for vertically propagating shear waves and horizontally propagating shear waves with vertical polarization (SV)

$$A_{66} = v^2 \tag{4d}$$

for horizontally propagating shear waves with horizontal polarization (SH)

$$A_{13} = A_{23} \tag{4e}$$

is coupled to off-axis qP and qS propagation.

The 3 axis is designated the vertical axis of this TIV medium. In practice, where the earth strata of interest exhibit primarily horizontal layering, the TIV medium provides a good model for seismic purposes. If additional parallel vertical fractures are imposed in addition to the layering, another form called a Fractured TIV or "FTIV medium" is created, which has especially relevant and useful parallels with the hydrocarbon bearing earth formations of interest to seismic exploration. A FTIV medium has eight independent elastic parameters $c_{ij}$. Both TI and FTIV media fall into the broader category of orthorhombic media, which are defined as having three mutually orthogonal planes of mirror symmetry. A general orthorhombic medium has nine independent elastic parameters $c_{ij}$.

In laboratory studies the acoustic slowness measurements are sometimes made in three directions: two axial directions plus one at 45 degrees. See Jones, L. E. A., and Wang, H. F., 1981, "Ultrasonic velocities in Cretaceous shales from the Williston basin" Geophysics, 46, 288–297. In such a controlled experiment, the axial measurements can be taken to determine directly $A_{11}, A_{33}, A_{55}$ and $A_{66}$ using equations (4). Given the single off-axis measurement point XZ, and the predetermined values of $A_{11}, A_{33}, A_{55}$, equations (2) and (3) would additionally yield a simple expression for $A_{13}$.

Where measurements are taken in multiple directions, as is often the case in field studies, and possibly without axial measurements, there has not been an accepted exact method for combining the multiple measurements to estimate elastic parameters except for the SH case.

In attempting to estimate elastic moduli from multiple measurements, one may solve for the moduli to best fit a given set of n measured phase points $\{(p_1, p_3)_i; i=1,n\}, n>3$, of known wave type. This type of estate has been done for the case of SH data in White, et al., (1983). Equation (1) becomes an over-determined linear system $$A_{66}X + A_{55}Z = 1,$$

$$X = [p_{1i}^2; i=1,n], Z = [p_{3i}^2; i=1,n], 1 = [1; i=1,n] \tag{5}$$

that can be solved for $A_{66}$ and $A_{55}$ by standard methods.

The qP and qS cases have commonly been treated by introducing approximate solutions to equation (2) based on the assumption that a medium is only weakly anisotropic. For example in Gaiser, J. E., "Transversely isotropic phase velocity analysis from slowness estimates", J. Geophys. Res., 95, 11241–11254 (1990), it has been proposed to approximate the slowness surface for qP waves, defined implicitly by equation (2), by an approximate function having the form $$v^2 = C_0 + C_2\cos(2\theta) + C_4\cos(4\theta) + C_6\cos(6\theta)$$

where in the notation of Equation (2) hereinabove, $$v^2 = \frac{1}{X+Z} \text{ and } \theta = \cos^{-1}\frac{X}{X+Z}$$

There has been no known way of directly solving the Christoffel relation (2) exactly without use of approximations or weak anisotropy assumptions. Also see White, J. E., Martineau-Nicoletis, L., and Monash, C., "Measured anisotropy in Pierre shale" *Geophysical Prospecting*, 31,709–725 (1983).

Accordingly, it is an object of the invention to determine the elastic moduli of anisotropic earth strata using acoustic and density data without making simplifying approximations of the Christoffel relation or the assumption of weak anisotropy.

It is also an object of the invention to improve the estimation of elastic moduli of anisotropic earth formations based on data from wide aperture VSP and density logs.

It is also an object of the invention to improve the speed, accuracy and methodology in the determination of elastic parameters of earth media.

SUMMARY OF THE INVENTION

In the present invention the elastic moduli are not estimated using approximated solutions to the Christoffel relation. Instead, the Christoffel relation is converted algebraically into a linear system and solved analytically to generate a solution for estimating elastic moduli. In a preferred embodiment of the invention, a set of qP phase points obtained from walkaway VSP data, with multiple vertical angles, plus at least one vertical SV point, are used to derive the elastic moduli $A_{11}, A_{13}, A_{33}, A_{55}$. In the case of FTIV or other orthothrombic media, the present invention may also be applied to obtain additional elastic moduli.

DETAILED DESCRIPTION

TI Algebraic Transformation

The qP-qSV Christoffel relation (2) can be rewritten as $$A_{11}[A_{55}X^2-X]+A_{33}[A_{55}Z^2-Z]+A[XZ]=[A_{55}(X+Z)-1]. \tag{6}$$

Given (squared) phase data points $\{(X_i,Z_i):i=1,n\}$ where n=number of phase points data, and a value for $A_{55}$, each of the bracketed quantities becomes a data vector and Equation (6) becomes a linear system similar to equation (3). With this altered view of the Christoffel relation, it becomes possible to consider other approaches to deriving values for the elastic parameters. Specifically, transform the original data points $(X_i,Z_i)$ to new variables $U_i, V_i, W_i, D_i$ defined as $$U_i = A_{55}X_i^2 - X_i, \ V_i = A_{55}Z_i^2 - Z_i, \ W_i = X_i Z_i, \ D_i = A_{55}(X_i+Z_i) - 1. \tag{7}$$

Let
$U = [U_i: i=1,\ldots,n]$
$V = [V_i: i=1,\ldots,n]$
$W = [W_i: i=1,\ldots,n]$
$D = [D_i: i=1,\ldots,n]$ Then equation (6) can be rewritten $$A_{11}U + A_{33}V + AW = D \tag{8}$$

Equation (8) represents a linear system having the unknown scalar coefficients $A_{11}, A_{33}$, and A, and is exactly equivalent to the statement that each data point satisfies the Christoffel relation. In matrix notation this takes the form $$\begin{bmatrix} U_1 & V_1 & W_1 \\ \cdot & & \\ \cdot & & \\ \cdot & & \\ U_n & V_n & W_n \end{bmatrix} \cdot \begin{bmatrix} A_{11} \\ A_{13} \\ A \end{bmatrix} = \begin{bmatrix} D_1 \\ \cdot \\ \cdot \\ \cdot \\ D_n \end{bmatrix} \tag{9}$$

A solution to such a linear problem can be computed exactly and quickly, for example using a commercial package such as the Mathematica Program available from Wolfram Research. Inc. Cf. *Mathematica* (Addison Wesley, 1971) pp. 659–662. Other representations and equivalent solutions to the above linear system will be obvious to skilled persons in this field, and will not be discussed further. Once $A_{11}, A_{33}$ and A have been determined, the elastic parameter $A_{13}$ can then be obtained from equation (3) assuming $A_{13}+A_{55}>0$, using the following equivalent form:

$$A_{13} = (A_{11}A_{33} + A_{55}^2 - A)^{\frac{1}{2}} - A_{55}. \tag{10}$$

An alternative solution for $A_{13}$ (with $A_{13}+A_{55}<0$) would yield a medium with the same phase slowness surfaces, but with anomalous polarizations near 45 degrees. For inversion of physical measurements, this case is unlikely to occur and can easily be distinguished by looking at polarizations near 45 degrees. Mathematically, it is simply a second solution to the inversion problem which is physically permitted provided certain stability conditions are met.

With the above understanding of the reparametrization, and referring to the figures, a preferred form of the method will be described.

Figure 1:
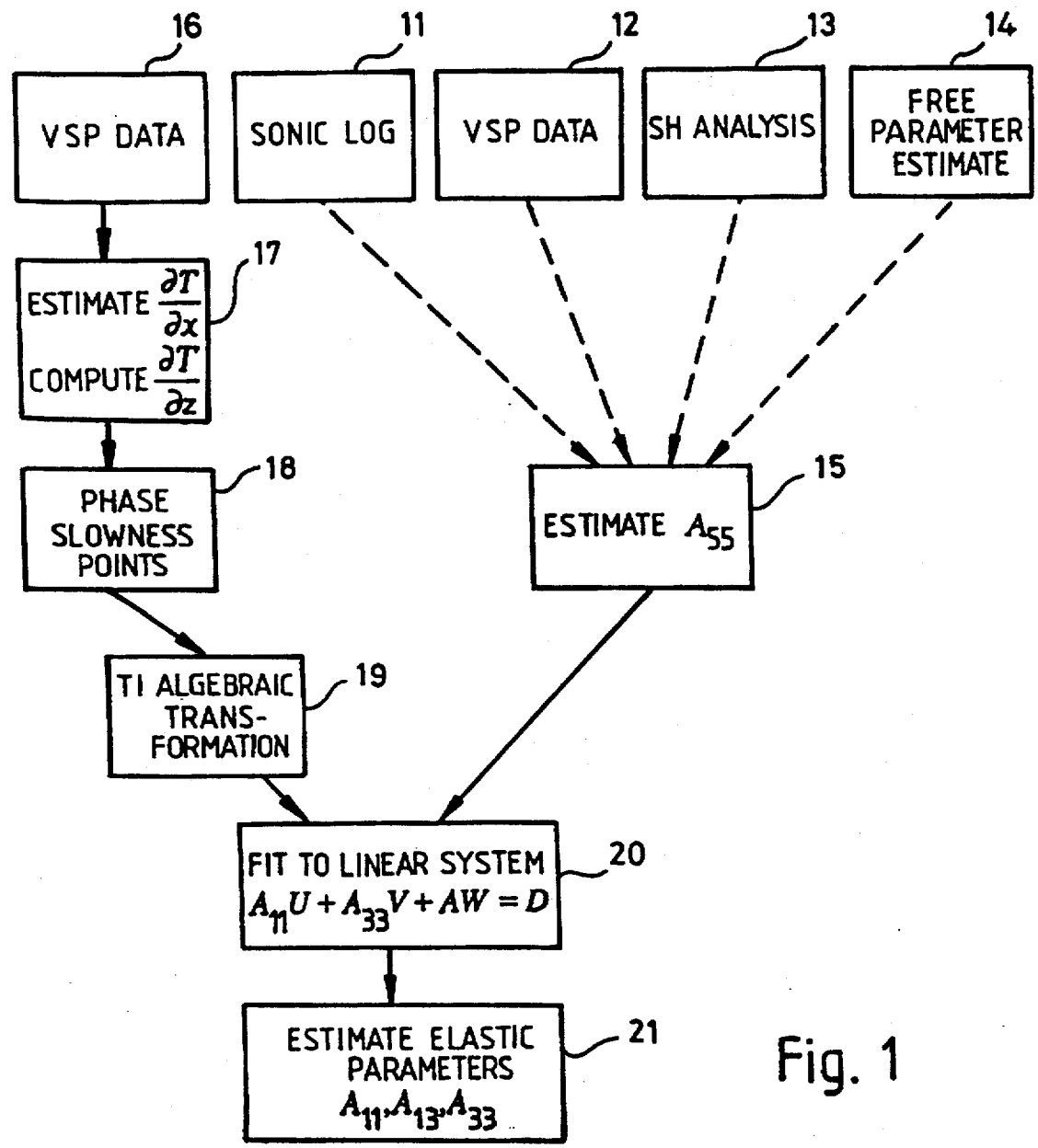
FIG. 1 is a flow diagram showing the steps in a preferred embodiment of the method of the invention in a TI medium.

Referring to FIG. 1, a value for the parameter $A_{55}$ is estimated or computed, at step 15, using any of various known methods. For example it is known to derive $A_{55}$ from SH Analysis 13 (See White, 1983), or from Free Parameter Analysis 14 indexing of a family of solutions to be optimised by a one-parameter search. It is also possible to derive $A_{55}$ from the Sonic Log 11 as the velocity-squared of the vertically propagating shear wave, or from Vertical Seismic Profile (VSP) data 12 as described below.

Figure 2:
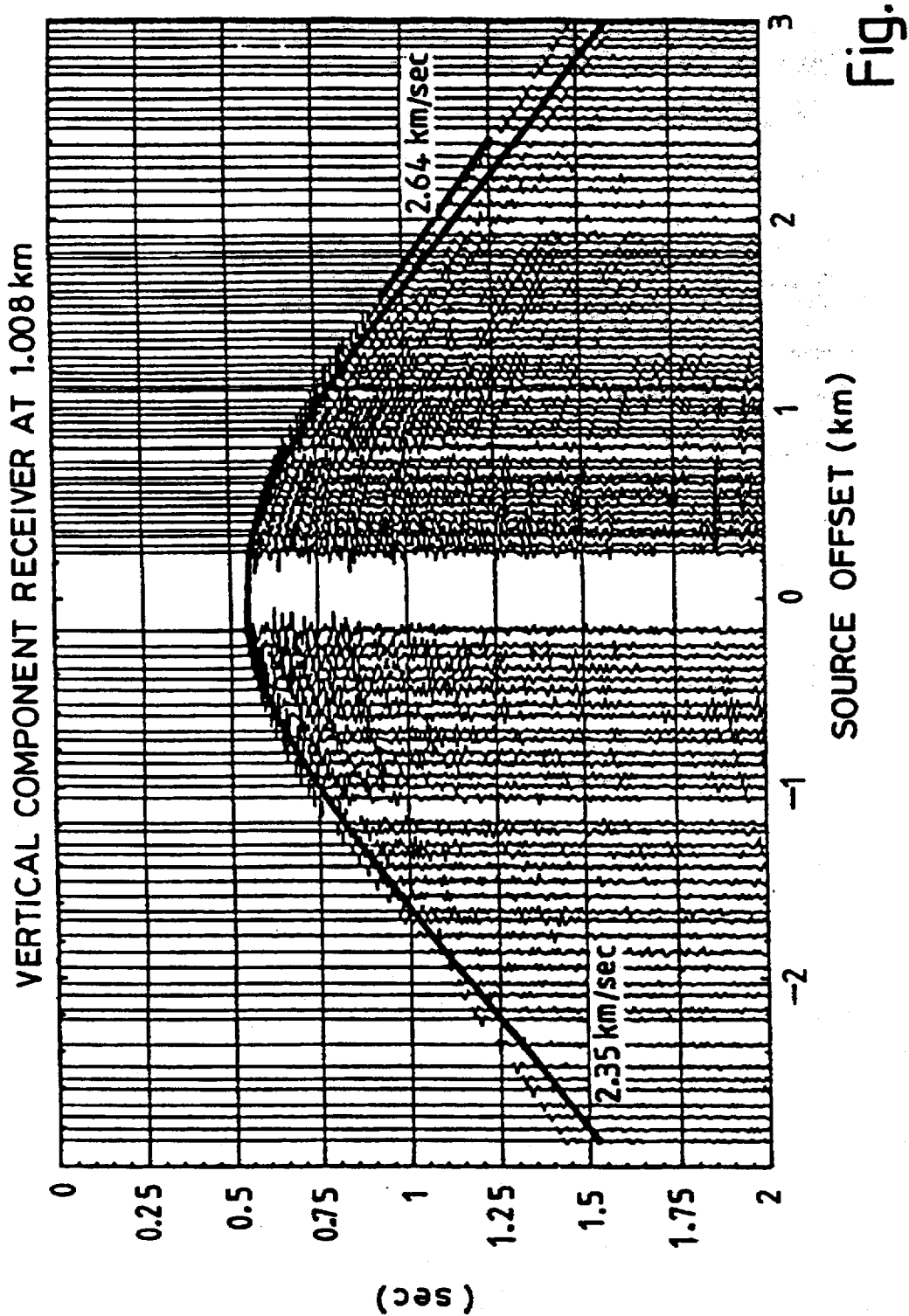
FIG. 2 shows VSP data used as inputs in accordance with the present invention.
Figure 3:
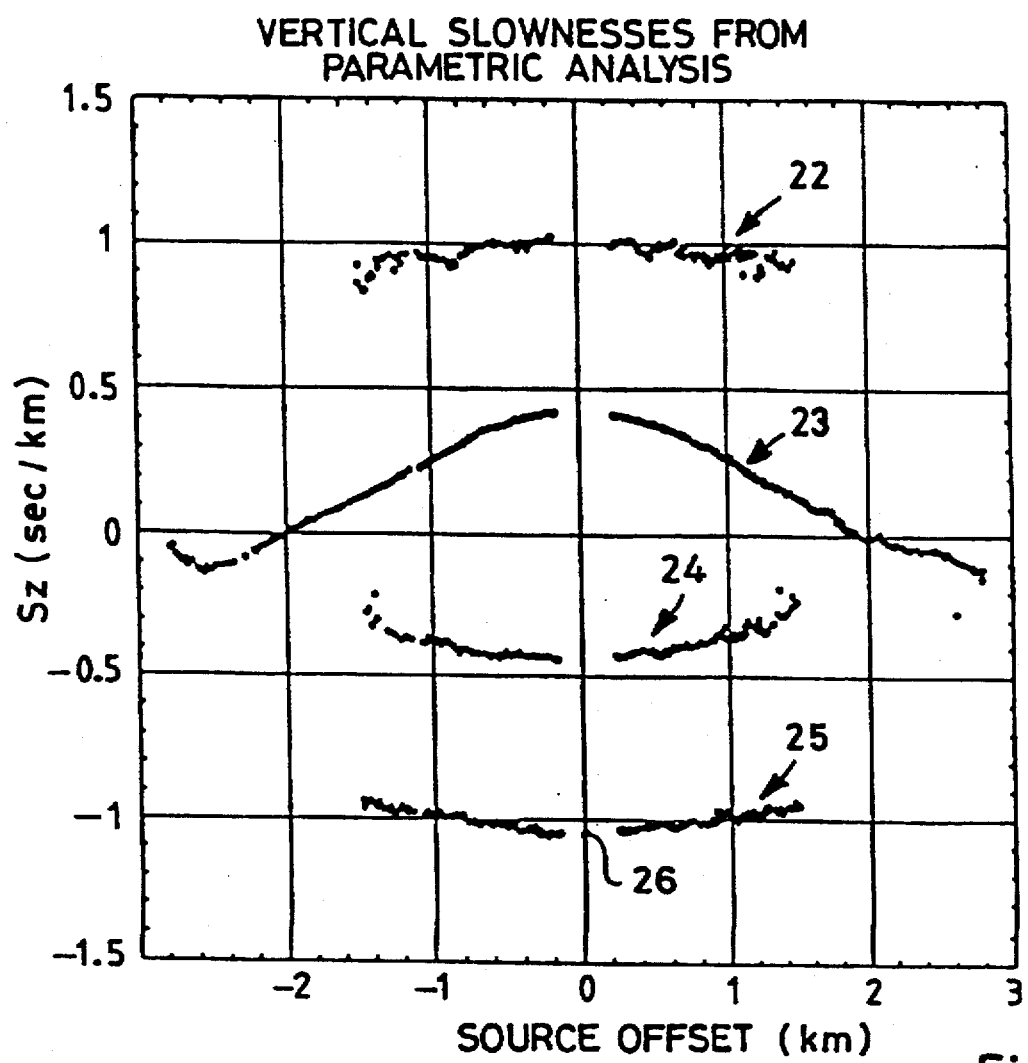
FIG. 3 shows vertical apparent slownesses for common source gathers computed from the VSP data of FIG. 2.

Raw VSP data 12 are shown in FIG. 2 as a function of seismic source offset (in kilometers). The vertical apparent slownesses are calculated for each common source gather and shown in FIG. 3 also as a function of source offset. The data points near 0 offset are missing because the drilling rig, located at point 0—0, prevented seismic shots from being taken at that point. The four vertical slowness curves are, from top to bottom, the downgoing qS wave 22, downgoing qP wave 23, reflected qP wave 24, and reflected qS wave 25, respectively. The 0 offset intercept point 26 can be used in Equation (4c) to obtain an estimate of the parameter $A_{55}$ at step 15, as mentioned above. The downgoing qP wave curve 23 is the requisite vertical slowness $\partial T/\partial z$ as a function of source offset.

Figure 4:
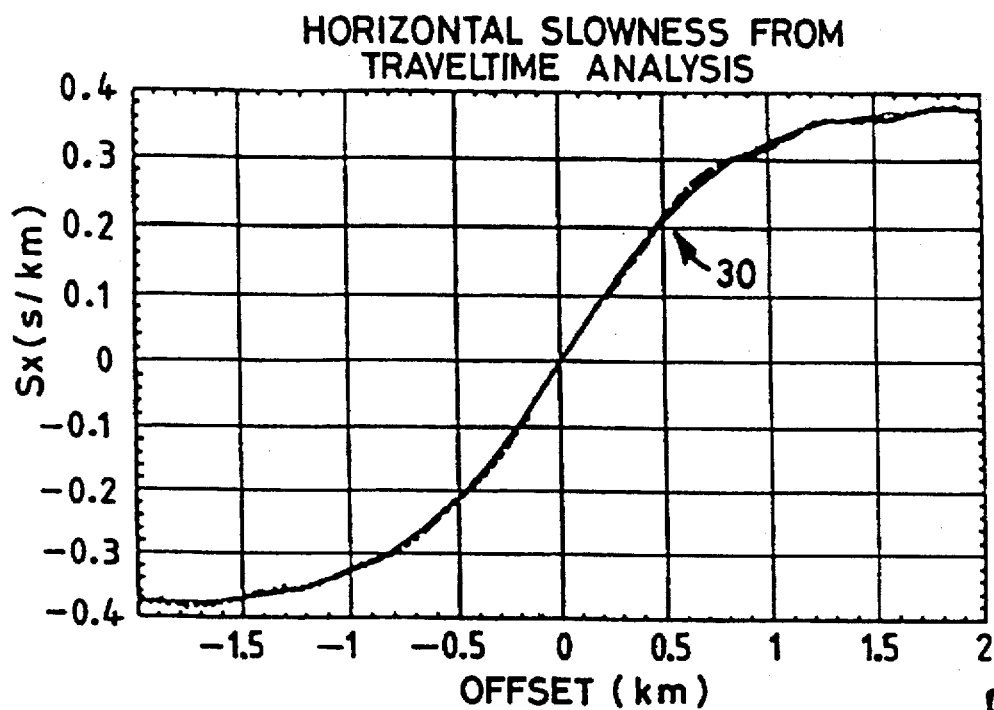
FIG. 4 shows the horizontal apparent slowness related to the VSP data of FIG. 2.

The VSP data 12 are also used to generate the horizontal apparent slowness 30 shown in FIG. 4 as a function of offset. Referring to FIG. 1 step 17, the VSP data 12 is used to estimate the travel time T(x) and hence $\partial T/\partial x$, the apparent qP horizontal slowness. The vertical slowness $\partial T/\partial z$, and horizontal slowness $\partial T/\partial x$, each as a function of offset, are combined to generate the cross plot of phase slowness points curve 40 shown in FIG. 5.

Figure 5:
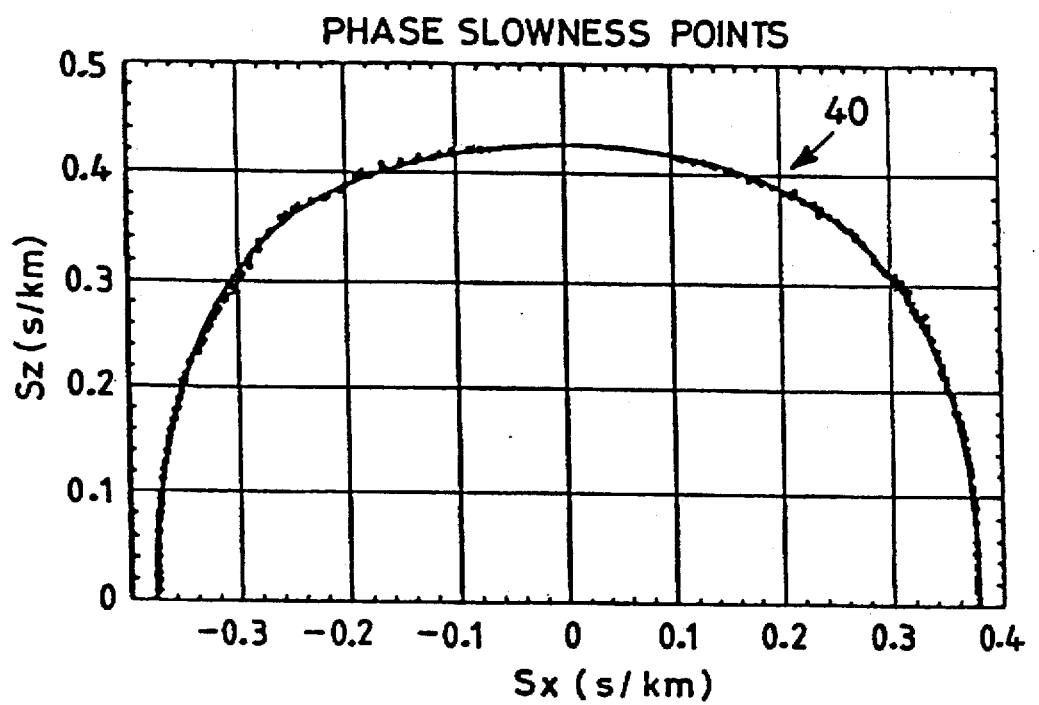
FIG. 5 shows a cross plot of estimated qP phase slowness points related to FIGS. 2–4, together with the analytic phase slowness curve for the best fitting TIV medium.

The Christoffel relation is reparametrized at 19 and the phase slowness points 40 are used as input data to transform to the Linear System 20 defined in equation (8). The phase slowness data 40 comprise a large number of phase slowness points scattered over almost the entire range of vertical angles. In fact, in accordance with the present invention, it is not necessary to obtain such a large amount of high quality phase slowness points, and only a few, for example three points covering a wide range of angles, would be adequate. This yields the elastic parameters $A_{11}$, $A_{13}$, and $A_{55}$ at step 21, as explained above. Curve 41 shown in FIG. 5 is the analytic slowness curve associated with the elastic moduli $A_{11}$, $A_{13}$, $A_{33}$, and $A_{55}$ that were obtained using the method herein described.

The estimation of the last independent elastic parameter for a TIV medium, $A_{66}$, is already known, for example using the technique described in Ellefsen, K. J. et al, "Estimating a shear modulus of a transversely isotropic formation", *Geophysics*, Vol. 57, No. 11 (November 1992) p. 1428–1434, or White (1983) mentioned earlier.

The method described above can be extended to use other types of acoustic phase point data, and to generate elastic parameters in media other than the TI type.

In a horizontally stratified offshore environment, offset VSP data can be acquired along multiple azimuthal lines to obtain, for each measured azimuth, qP phase points at all vertical angles, together with a single vertical SV point. With this type of measurement set, and considering that the true medium may show azimuthal as well as vertical anisotropy, it is possible to use the TI Transformation in a more general medium which is not simply Transversely Isotropic. For example, given various symmetry conditions of a non-TI medium, it will be possible to use the method of the present invention to obtain elastic parameters, while deviating from the detailed preferred embodiment shown and described herein.

Figure 6:
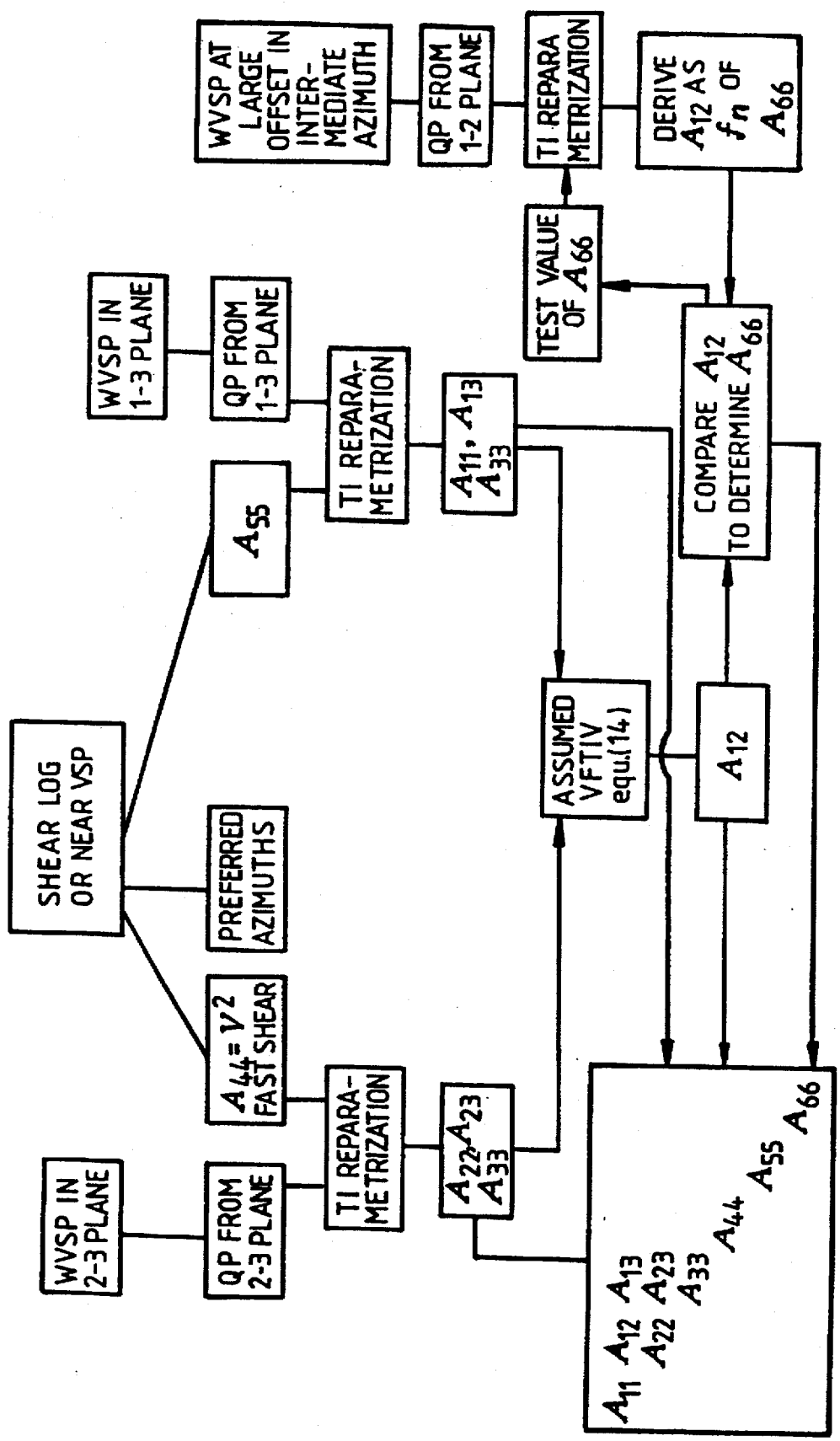
FIG. 6 is a flow diagram showing an extension of the present invention to determining elastic parameters in a Fractured TIV medium.

Given data from a single azimuth, as in the example discussed earlier, or from multiple azimuths in which the data is seen to be independent of azimuth, density-normalised moduli characterising the medium may be directly obtained as described. When the data show variation with azimuth, provided certain symmetry conditions are met, the TI Transformation can be used as part of a method to obtain the elastic moduli for the medium. For example, the determination of elastic parameters in a Fractured TIV medium using the present invention is shown in FIG. 6, and will be described below.

A FTIV medium, assuming a single fracture set aligned with the 2-axis has elastic moduli that satisfy the symmetry relations of an orthothrombic medium, together with an additional relation given in Hood, J. A., and Schoenberg, M., "Estimation of vertical fracturing from measured elastic moduli,"*Geophys. Res.*, 94, 15611–15618 (equation 13) (1989):

$$A_{12}=(A_{13}A_{22}-A_{11}A_{23})/(A_{23}-A_{13}). \tag{11}$$

It is known that for qP and qSV propagation with the slowness vector in one of the symmetry planes, the Christoffel relation reduces to the TI form of Equation (2). In the 1-3 plane, Equation (2) holds as written. In the 2-3 plane, in Equation (2), one must change all subscript 1's to 2's and 5's to 4's. In the 1-2 plane, in Equation (2), one must change all subscript 3's to 2's and 5's to 6's. Based on this transformation and the above observation, the inversion problem for FTIV media is reduced to the inversion problem for these associated TI cases.

The data set that is needed, assuming knowledge of the symmetry directions, would include phase slowness measurements, for example Walkaway VSP ("WVSP"), in the two symmetry planes plus a third at an intermediate azimuth, for example at about 45 degrees thereto. A practical sequence for obtaining the elastic parameters of a Fractured TIV medium would comprise the following.

First, identify the symmetry directions and determine $A_{55}$ and $A_{44}$. This may be done in advance using shear sonic measurements, or by examining multiple azimuth walkaway VSP data. An estimate for vertical qSV slowness can be obtained in a single azimuth by observing upgoing shear waves at near vertical incidence. The 2-3 plane (parallel to the fractures) can be determined from multi-azimuth data as the azimuth with the minimum qP slowness at all vertical angles. This information could also be obtained from polarization analysis of vertical shear waves (shear splitting) in shear VSP or shear sonic data. If the data is independent of azimuth, then the medium is TIV and can be handled by the use of the TI Algebraic Transformation and Linear System solution as previously described. If the medium does not show two orthogonal planes of mirror symmetry, then this is not an orthorhombic medium and it is noted that the present method would not apply exactly.

Next, use the TI Algebraic Transformation to invert the qP data in the 1-3 plane for $\{A_{11}, A_{13}, A_{33}, A_{55}\}$ and in the 2-3 plane for $\{A_{22}, A_{23}, A_{33}, A_{44}\}$. The elastic parameter $A_{12}$ may be derived directly using Equation (11).

Finally, invert a set of at least three qP points from the 1-2 plane to determine $A_{66}$. This can be done by using the TIV transformation applied to the 1-2 plane qP points to determine $A_{12}$, and altering the parameter $A_{66}$ in the transformation until the output value of $A_{12}$ satisfies Equation (11).

In a more general orthorhombic medium, Equation (11) may not hold. However, in situations where an independent estimate of $A_{66}$ can be made (say, from use of tube-wave data, or in a lab study), then the horizontal qP points can be used to determine $A_{12}$ using the TI Transformation in the 1-2 plane as in Step (b) without use of Equation (11). If only vertical shear points are available and the medium is not far from a fractured TIV medium (in the sense that Equation (11) gives a plausible value for $A_{12}$), then the method described in the previous paragraph is likely to yield a fractured TIV medium that agrees to experimental accuracy with the true medium at all the measured phase points.

The elastic parameters determined in the present invention are useful for various aspects of seismic processing. The elastic moduli contribute to the velocity models used for anisotropic migration, and serve to calibrate AVO studies. Elastic moduli are also fundamental properties of rocks that are important in determining and controlling wellbore stability, permeability, shale maturation, pore pressure and other related parameters.

It is clear that the methods described herein are not limited to use of the particular mathematical forms and conventions used, and that the elastic parameters $A_{ij}$ are essentially equivalent to the parameters $C_{ij}$ used in the cited publications, and these are also convertible to other representations. Similarly, it is obvious that the mathematical expressions have various equivalents, which may be encompassed within the scope of the present invention.

I claim:

1. A method of characterizing anisotropic properties of an earth medium, comprising the steps of:

a) acquiring phase slowness data which satisfy a Christoffel relationship from seismic measurements of the earth medium;

b) transforming the phase slowness data so as to provide a series of equivalent linear equations which linearize the Christoffel relationship;

c) deriving a solution of the system of linear equations resulting from the transformation; and d) deriving the elastic properties of the earth medium from the solution.

2. A method as claimed in claim 1, wherein the step of transforming the phase slowness data provides a series of linear equations which linearize a mathematically equivalent representation of the Christoffel relationship.

3. A method as claimed in claim 2, wherein the phase slowness data are transformed according to $$U=[A_{55}X_i^2-X_i\!:\!i=1,n],\ V=[A_{55}Z_i^2-Z_i\!:\ i=1,n],\ W=[X_iZ_i\!:\!i=1,n],$$
$$D=[A_{55}(X_i+Z_i)-1\!:\!i=1,n]$$

and using the system of linear equations defined by $$A_{11}U+A_{33}V+AW=D$$

to represent the Christoffel relationship from which the earth elastic properties are derived.

4. A method as claimed in claim 1, wherein at least three phase slowness points are used for transforming the data so as to characterize the anisotropic properties of a TI earth medium.

5. A method as claimed in claim 1, comprising using an independent estimation of elastic parameter $A_{55}$ as an input to the transforming step.

6. A method as claimed in claim 3, comprising using an independent estimation of elastic parameter $A_{55}$ as an input to the transforming step.

7. A method as claimed in claim 3, further comprising obtaining phase slowness data from at least one symmetry plane of an orthorhombic medium and applying the transformation to the phase slowness data to derive elastic parameters associated with the at lest one symmetry plane.

8. A method as claimed in claim 7, comprising varying $A_{66}$ as a test parameter to generate a value of $A_{12}$ in accordance with the transforming step to match a value of $A_{12}$ generated by $A_{12}=(A_{13}A_{22}-A_{11}A_{23})/(A_{23}-A_{13})$.

9. A method as claimed in claim 1, further comprising generating a velocity model of the earth medium using the elastic parameters.

10. A method as claimed in claim 1, further comprising generating an AVO model of the earth medium using the elastic parameters.

11. A method as claimed in claim 1, further comprising generating a model for mechanical properties of the earth medium using the elastic parameters.

* * * * *